US011490705B2

(12) United States Patent
Vasileiadis et al.

(10) Patent No.: US 11,490,705 B2
(45) Date of Patent: Nov. 8, 2022

(54) SAFE CONTAINER FOR GROOMING PRODUCTS (71) Applicant: Bic Violex S.A., Anoixi (GR)

(72) Inventors: Andreas Vasileiadis, Anoixi (GR); Athanasia Gkika, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 227 days.

(21) Appl. No.: 17/106,401

(22) Filed: Nov. 30, 2020

(65) Prior Publication Data
US 2021/0186175 A1 Jun. 24, 2021

(30) Foreign Application Priority Data
Dec. 19, 2019 (EP) .................................... 19217907

(51) Int. Cl.
A45D 27/24 (2006.01)
G06V 40/12 (2022.01)
G08B 21/18 (2006.01)
G07C 9/00 (2020.01)

(52) U.S. Cl.
CPC ............ A45D 27/24 (2013.01); G06V 40/12 (2022.01); G07C 9/00563 (2013.01); G08B 21/18 (2013.01)

(58) Field of Classification Search
None
See application file for complete search history.

(56) References Cited

U.S. PATENT DOCUMENTS

| 4,232,785 A | 11/1980 | Lucas |
| 5,240,107 A * | 8/1993 | Casale ............... B26B 21/4087 340/568.1 |
| 5,738,122 A | 4/1998 | Armbruster et al. |
| 8,646,467 B2 * | 2/2014 | Lelieveld ............... B26B 21/40 132/289 |
| 10,265,247 B1 | 4/2019 | Sidi |
| 10,285,449 B2 * | 5/2019 | Murison ............... A24F 15/015 |
| 11,124,340 B2 * | 9/2021 | Crawley ............ B65D 43/0231 |
| 2012/0152004 A1 * | 6/2012 | Bari ....................... C02F 1/003 73/61.61 |
| 2018/0127180 A1 | 5/2018 | Gordon |
| 2018/0280637 A1 * | 10/2018 | Mayle ..................... A24F 40/60 |

(Continued)

FOREIGN PATENT DOCUMENTS

| CN | 110464650 A | 11/2019 |
| EP | 3026643 A1 | 6/2016 |

(Continued)

OTHER PUBLICATIONS

European Search Report in corresponding Application No. EP19217907. 5, dated May 26, 2020, (6 pages).

(Continued)

Primary Examiner — Muhammad Adnan
(74) Attorney, Agent, or Firm — Bookoff McAndrews, PLLC (57) ABSTRACT A safe container comprises a first receptacle configured to receive a grooming product and a biometric lock configured to selectively open the first receptacle to a designated user. The grooming product may include a shaver and/or razor blade cartridges. The biometric lock may include a fingerprint reader.

19 Claims, 11 Drawing Sheets (56) References Cited

U.S. PATENT DOCUMENTS

| | | | | |
|---|---|---|---|---|
| 2019/0167927 A1* | 6/2019 | Dagnello | ................ | A24F 40/60 |
| 2019/0248555 A1* | 8/2019 | Cabouli | ............. | G07C 9/00563 |
| 2019/0277552 A1* | 9/2019 | Vu | ........................ | F25D 23/025 |
| 2020/0000143 A1* | 1/2020 | Anderson | ................ | G06F 21/44 |
| 2020/0077706 A1* | 3/2020 | Wilson | ................ | A61M 15/009 |
| 2021/0056436 A1* | 2/2021 | Shah | ...................... | G06N 20/00 |

FOREIGN PATENT DOCUMENTS

| | | |
|---|---|---|
| KR | 200488291 Y1 | 1/2019 |
| WO | 2019001893 A1 | 1/2019 |
| WO | 2019001894 A1 | 1/2019 |
| WO | 2019001895 A1 | 1/2019 |
| WO | 2019011523 A1 | 1/2019 |

OTHER PUBLICATIONS

"Introducing the Series 9," Braun, https://se.braun.com/en/products/male-grooming/electric-shavers/series-9-chrome-with-travel-case (1 page).

* cited by examiner

SAFE CONTAINER FOR GROOMING PRODUCTS

This application claims benefit from European patent application EP19217907.5 filed on 19 Dec. 2019, its content being incorporated herein by reference.

TECHNICAL FIELD

The disclosure relates to the field of containers, and in particular to safe containers for grooming products such as shavers and razor blade cartridges.

BACKGROUND

A variety of stands and containers have been proposed to help handle grooming products such as shavers and razor blade cartridges. For instance, a storage canister for such grooming products was disclosed in U.S. Pat. No. 5,738, 122. Other devices for supporting or otherwise facilitating handling of such grooming products were disclosed in U.S. Pat. Nos. 8,646,467 and 4,232,785. These stands and containers, however, did not present any feature for restricting access to the grooming products.

Restricting access to grooming products may be desirable for safety and hygienic reasons. For instance, razor blades and even razor blade cartridges may represent a hazard for infants. Even between adults, sharing grooming products may be unhygienic and spread infectious disease.

SUMMARY

A first object of the disclosure is that of safely restricting access to grooming products.

Accordingly, following an aspect of the present disclosure, a safe container is provided. The safe container comprises a first receptacle configured to receive a grooming product, a biometric lock configured to selectively open the first receptacle to a designated user, and a sensor for detecting that a quantity within the first receptacle is below a designated threshold.

Consequently, access to a grooming product within the first receptacle of the safe container may be safely restricted to the designated user, using stored biometric data of the designated user, such as fingerprint, voice, face or iris data, which may be recognized by the biometric lock.

In examples, the safe container may further comprise a transceiver for receiving and transmitting data, which may in particular be a wireless transceiver. Consequently, the safe container may be integrated into a data network, such as the Internet of Things (IoT).

According to examples, the safe container may further comprise a power supply unit to ensure power supply to i.a. the biometric lock. The power supply unit may comprise a rechargeable power storage device, allowing at least partial portability of the safe container, and may further comprise a contactless power receiver to ensure safe charging of the rechargeable power storage device even in a humid environment such as that of a bathroom. Moreover, this safe container may comprise a charging station for charging the rechargeable power supply unit of the power supply unit, and a main body, separable from the charging station, containing the first receptacle, the biometric lock and the power supply unit. The charging station may comprise a contactless power transmitter to transmit power to the contactless power receiver. Both the charging station and the main body may comprise transceivers, and in particular wireless transceivers, to communicate with each other and/ or with other devices.

In examples, the safe container may comprise one or more information output units, which may in particular include a visual display and/or a speaker, although they may be configured to provide other output forms, e.g. haptic, additionally or alternatively to visual and/or acoustic. If the safe container comprises a main body and a charging station, the information output units may be provided in either one or both of the main body and the charging station.

In examples, the biometric lock may comprise a fingerprint reader, although other biometric authentication methods, such as e.g. voice recognition, face recognition and/or iris scanning may be used alternatively or additionally to fingerprint recognition in the biometric lock.

In examples, the biometric lock may comprise an actuator. In particular, the actuator may be configured to open the first receptacle, for example by rotating an opening in the safe container into alignment with the first receptacle. Alternatively, however, it may be configured to release a hold preventing manual opening of the first receptacle, for instance to release a latch preventing manual rotation of the opening in the safe container into alignment with the first receptacle.

In examples, the safe container may further comprise a second receptacle, and the biometric lock may be configured to selectively open the first receptacle and the second receptacle to the designated user.

In examples, the grooming product may be a shaver. Furthermore, the sensor may be a sensor for detecting one or more razor blade cartridges within the second receptacle.

In another aspect of the present disclosure provides for a method for using the safe container substantially as disclosed herein. The method comprises determining, for instance with the sensor, that a quantity (for example, a number of razor blade cartridges) within the first receptacle and/or within the second receptacle is below a designated threshold, and issuing a warning that the quantity is below the designated threshold. To facilitate purchasing new razor blade cartridges to refill the safe container, the method may further comprise additional steps of authenticating a razor blade cartridge order, possibly using the biometric lock, and transmitting the razor blade cartridge order, possibly using the transceiver.

The above summary of some example embodiments is not intended to describe each disclosed embodiment or every implementation of the invention. In particular, selected features of any illustrative embodiment within this specification may be incorporated into an additional embodiment unless clearly stated to the contrary.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges means the value, limit, and/or range +/−10%.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings.

DETAILED DESCRIPTION

Reference will now be made in detail to the exemplary embodiments of the present disclosure described below and illustrated in the accompanying drawings. Wherever possible, the same reference numbers will be used throughout the drawings to refer to same or like parts.

As illustrated in FIGS. 1 to 4, a safe container 10 according to a first embodiment may comprise a first receptacle 11 for receiving a shaver, and in particular a shaver 100 with an exchangeable razor blade cartridge 101, and a second receptacle 12 for receiving one or more spare razor blade cartridges 101. The safe container 10 may further comprise a biometric lock with a sensor 13; an electronic control unit 14 connected to the sensor 13, and an actuator 15 connected to the electronic control unit 14, configured to selectively open the first and the second receptacle 11,12 to a designated user. As illustrated, the sensor 13 may be a capacitive sensor, and the electronic control unit 14 may be adapted to recognize fingerprint features on the sensor 13, thus forming a fingerprint reader together with the sensor 13. Alternatively, however, the sensor 13 may be a camera, and the electronic control unit 14 may be adapted to recognize faces or iris features in images from the sensor 13, thus forming a face or iris recognition system, or the sensor 13 may be a microphone, and the electronic control unit 14 may be adapted to recognize voice features, thus forming a voice recognition system. The electronic control unit 14 may comprise a data processor and a data storage device. The data processor may be adapted to match biometric features, such as fingerprint, face, iris or voice features, to corresponding biometric features of the designated user stored in the data storage device and, in response to a positive match, activate the actuator 15 to selectively open the first and the second receptacle 11,12 to the designated user.

Figure 1:
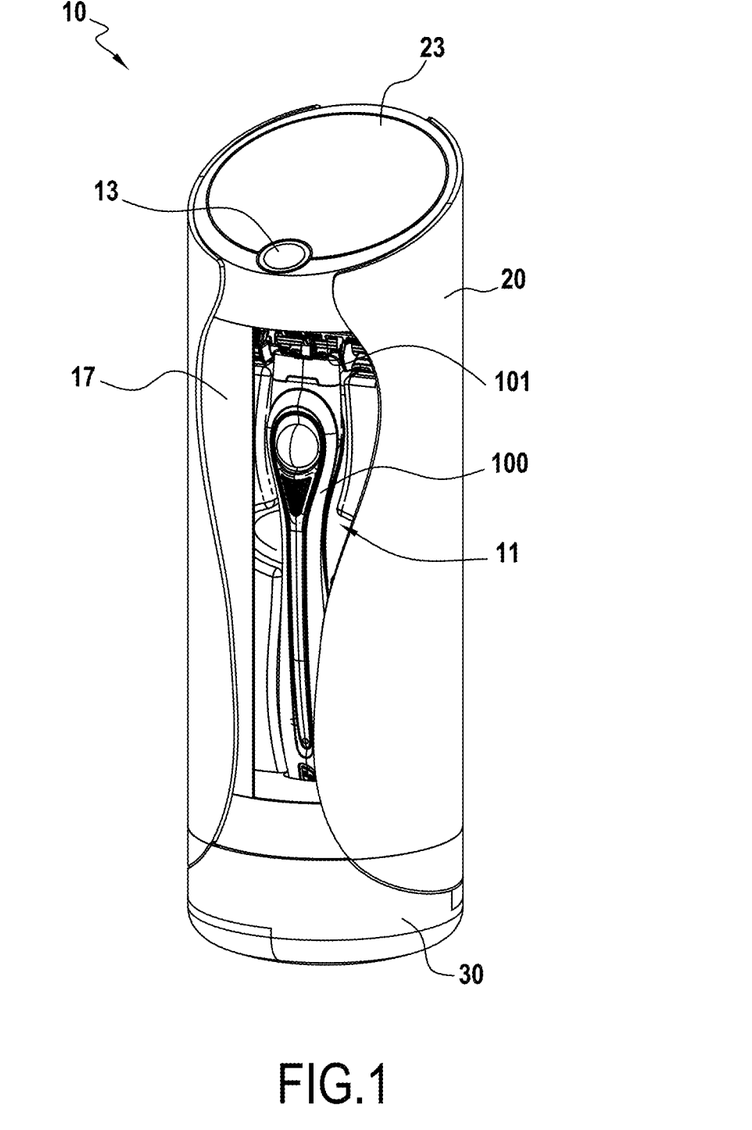
FIG. 1 is a forward perspective view of a safe container for grooming products.
Figure 2:
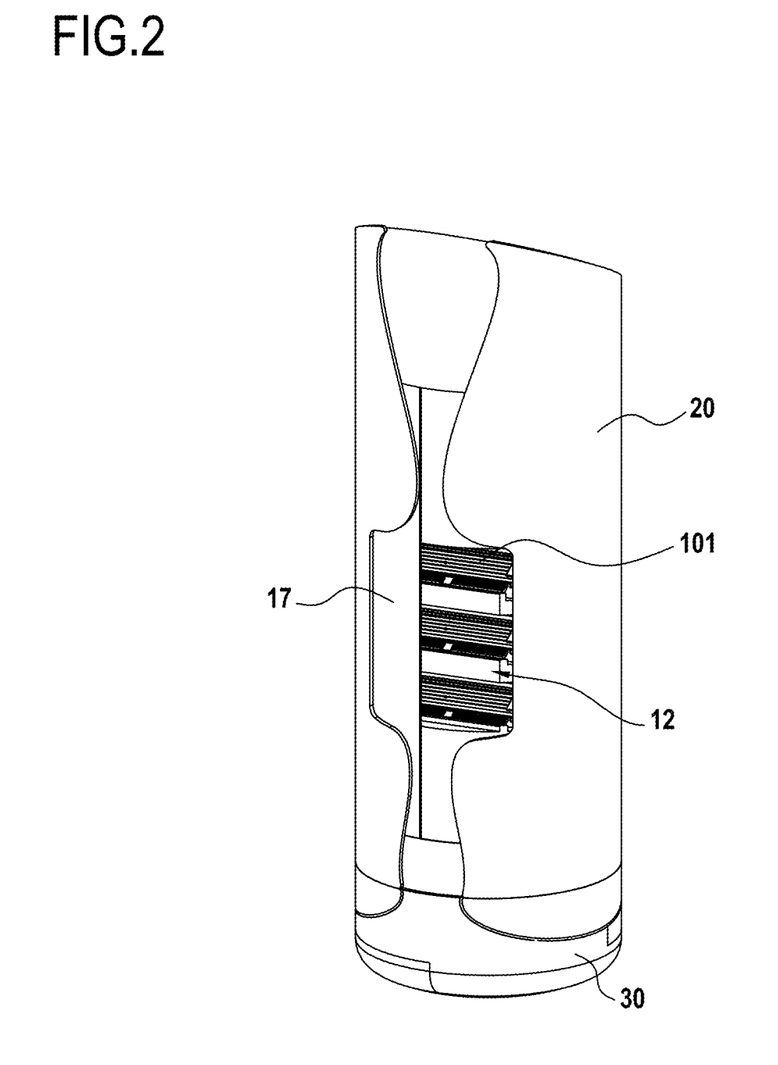
FIG. 2 is a rear perspective view of the safe container of FIG. 1.
Figure 3:
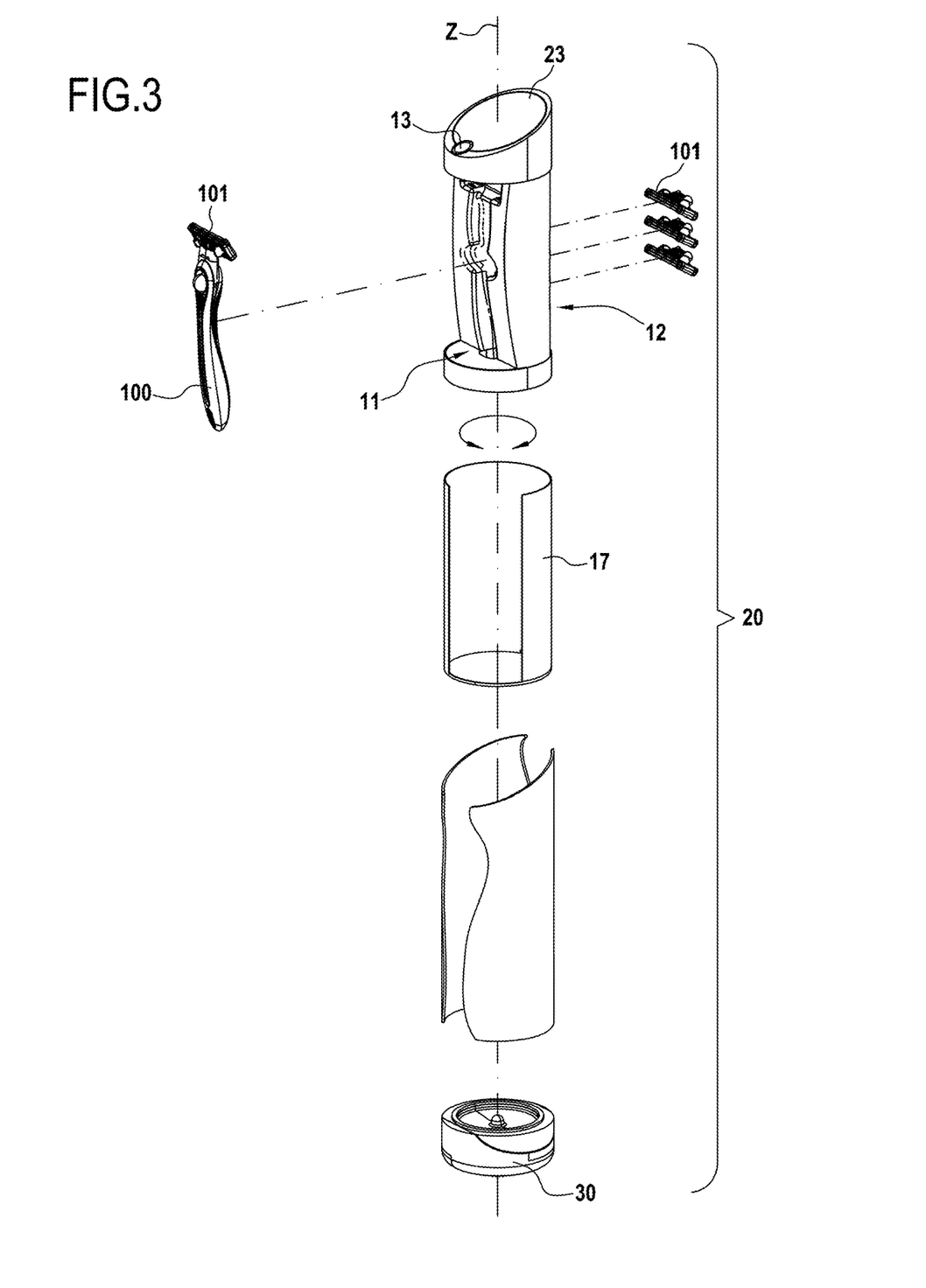
FIG. 3 is an exploded perspective view of the safe container of FIG. 1.

The actuator 15 may be a rotary actuator configured to rotate a wall 17 of the safe container 10, for example around a vertical axis Z, so that the first and/or the second receptacle 11, 12 come into alignment with a corresponding opening in the wall 17. Alternatively, however, the actuator 15 may be configured to release a latch to allow manual opening of the first and/or the second receptacle 11, 12, for instance by manual rotation of the wall 17 around the vertical axis Z, so that the first and/or the second receptacle 11, 12 come into alignment with a corresponding opening in the wall 17. As illustrated in FIG. 3, the wall 17 may be a transparent, cylindrical wall with a single opening that can be rotated clockwise or counter-clockwise around vertical axis Z to come into alignment with either the first receptacle 11 or the second receptacle 12

Figure 4:
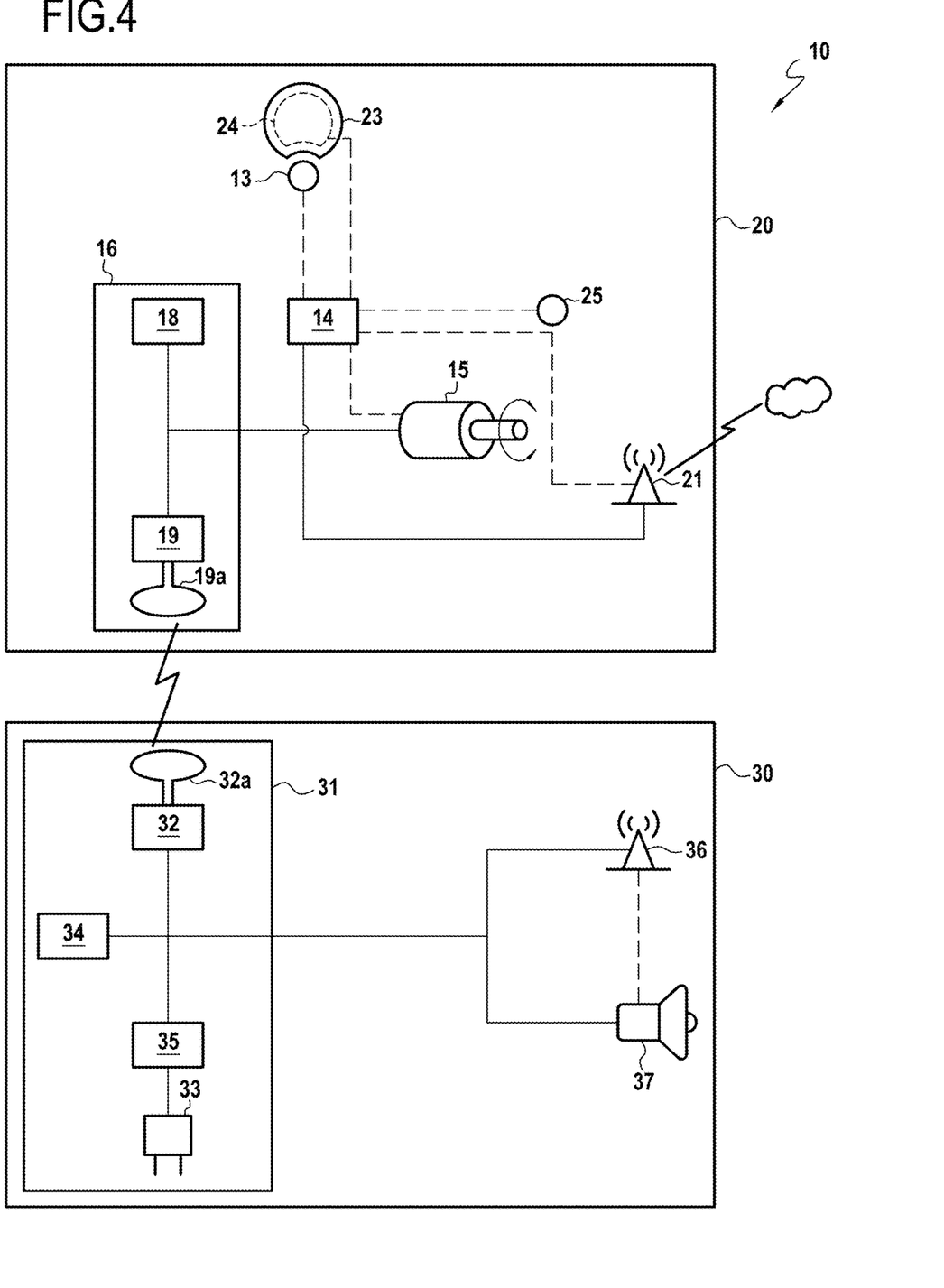
FIG. 4 is a functional scheme of the safe container of FIG. 1.

As also shown in FIG. 3, the safe container 10 may include two separable parts: a main housing 20 and a charging station 30. As shown in FIG. 4, the main housing 20 may comprise, apart from the abovementioned first and second receptacles 11,12 and biometric lock, a first power supply unit 16 for supplying power at least to the biometric lock. For this purpose, the first power supply unit 16 may be electrically connected to at least the electronic control unit 14 and to the actuator 15. The first power supply unit 16 may include a first power storage device 18 and/or a first power receiver 19. The first power storage device 18 may in particular include a rechargeable device such as a secondary battery, e.g. a lithium-ion or a nickel-cadmium secondary battery, but may alternatively or additionally include a non-rechargeable power storage device such as a primary battery, e.g. an alkaline battery. In case that the first power storage device 18 includes a rechargeable device, the first power receiver 19 may be electrically connected to the first power storage device 18 for recharging the rechargeable device.

As further shown in FIG. 4, the charging station 30 may comprise a second power supply unit 31. The second power supply unit 31 may in particular comprise a power transmitter 32 for transmitting power to the power receiver 19 of the first power supply unit 16, and a second power receiver 33 and/or a second power storage device 34. The first power receiver 19 and the power transmitter 32 may be configured for contactless power transmission from the former to the latter. For this purpose, the first power receiver 19 and the power transmitter 32 may for example each include an induction loop 19a, 32a, and the induction loops 19a, 32a may be aligned with each other. Alternatively, however, the first power receiver 19 and the power transmitter 32 may include electric contacts configured to conduct electricity from the power transmitter 19 to the first power receiver 19. Like the first power storage device 18, the second power storage device 34 may in particular include a rechargeable device such as a secondary battery, e.g. a lithium-ion or a nickel-cadmium secondary battery, but may alternatively or additionally include a non-rechargeable power storage device such as a primary battery, e.g. an alkaline battery. The second power receiver 33 may in particular comprise a conventional power plug and cord, and may be electrically connected to the power transmitter 32 and/or to the second power storage device 34, eventually through a power converter 35, to supply them with electric power.

The safe container 10 may also comprise one or more transceivers for receiving and transmitting data, in particular one or more wireless transceivers. For instance, the safe container 10 may comprise a first wireless transceiver 21, which may be located within the main housing 20, and may be adapted for wireless local area network communication, for instance using an IEEE 802.11 protocol. This first wireless transceiver 21 may be operatively connected to the electronic control unit 14 so as to transmit data to and/or receive data from the electronic control unit 14, and electrically connected to the first power supply unit 16 for receiving electric power. The safe container 10 may comprise a second wireless transceiver 36, which may be located within the charging station 30, and may for example be a Bluetooth® transceiver, for pairing with external devices equipped with compatible transceivers. This second wireless transceiver 36 may be electrically connected to the second power supply unit 21 for receiving electric power, and may have a shorter range than the first wireless transceiver 21.

Figure 5:
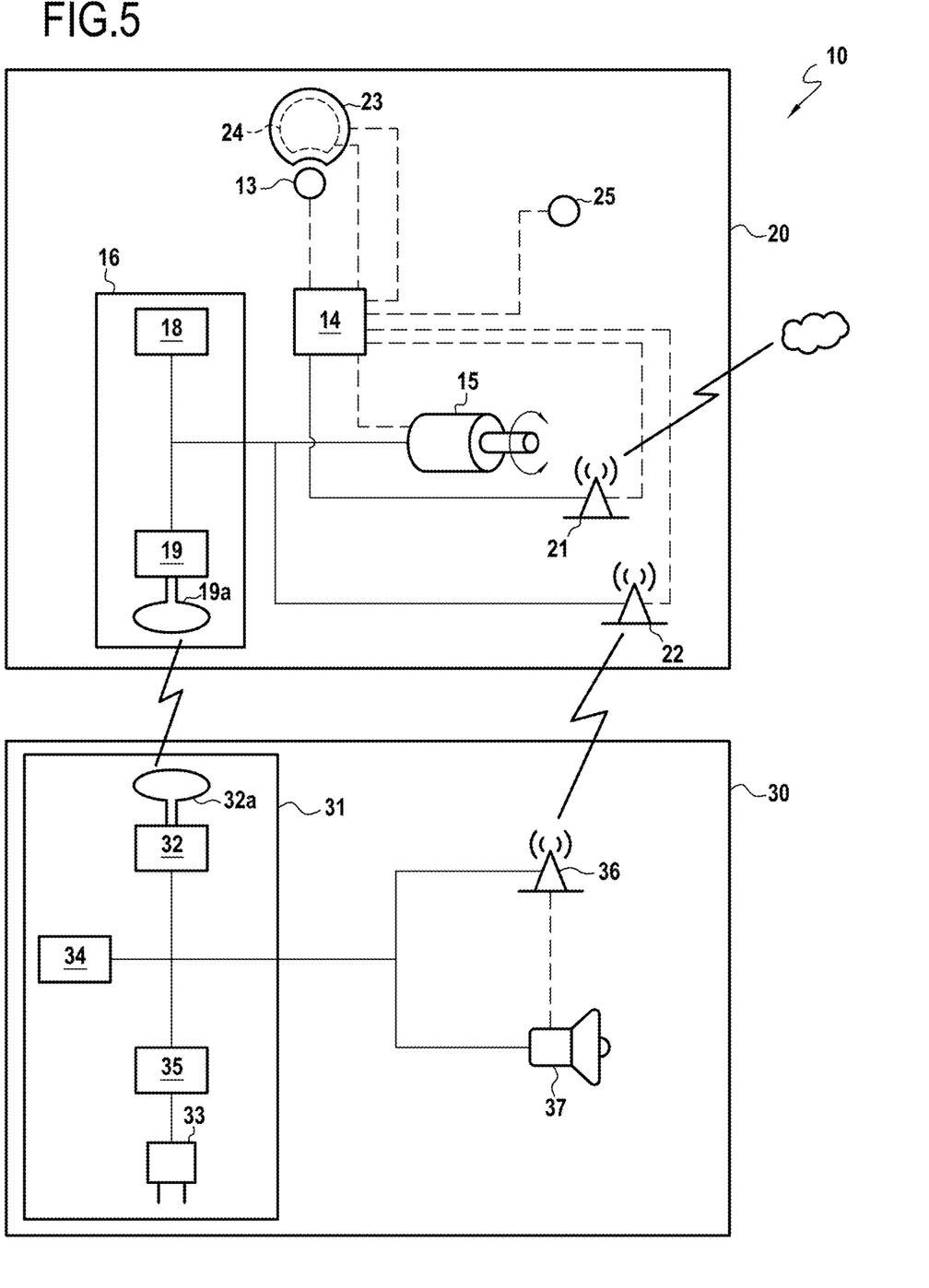
FIGS. 5 to 7 illustrate alternative functional arrangements of the safe container of FIG. 1.
Figure 6:
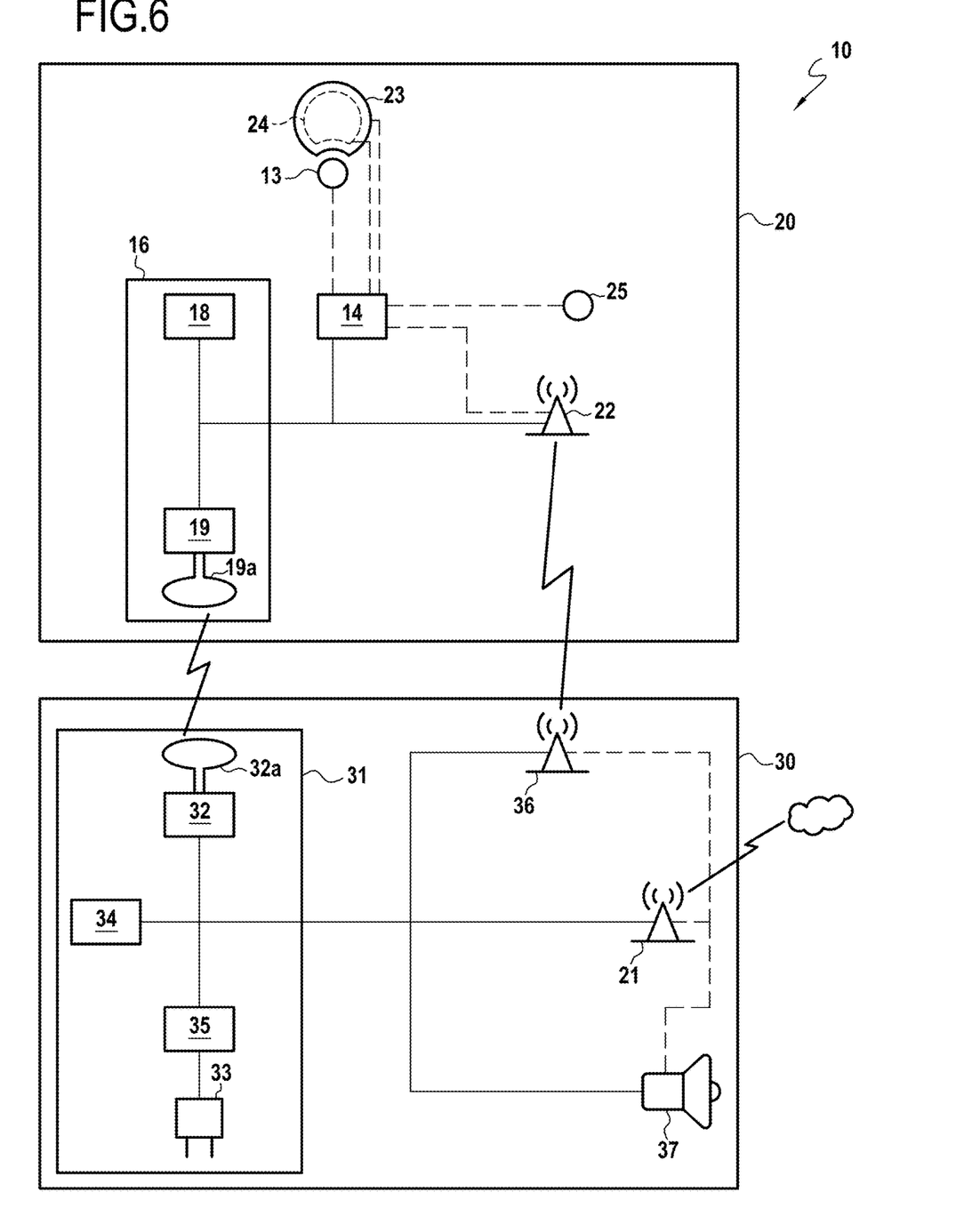
Figure 7:
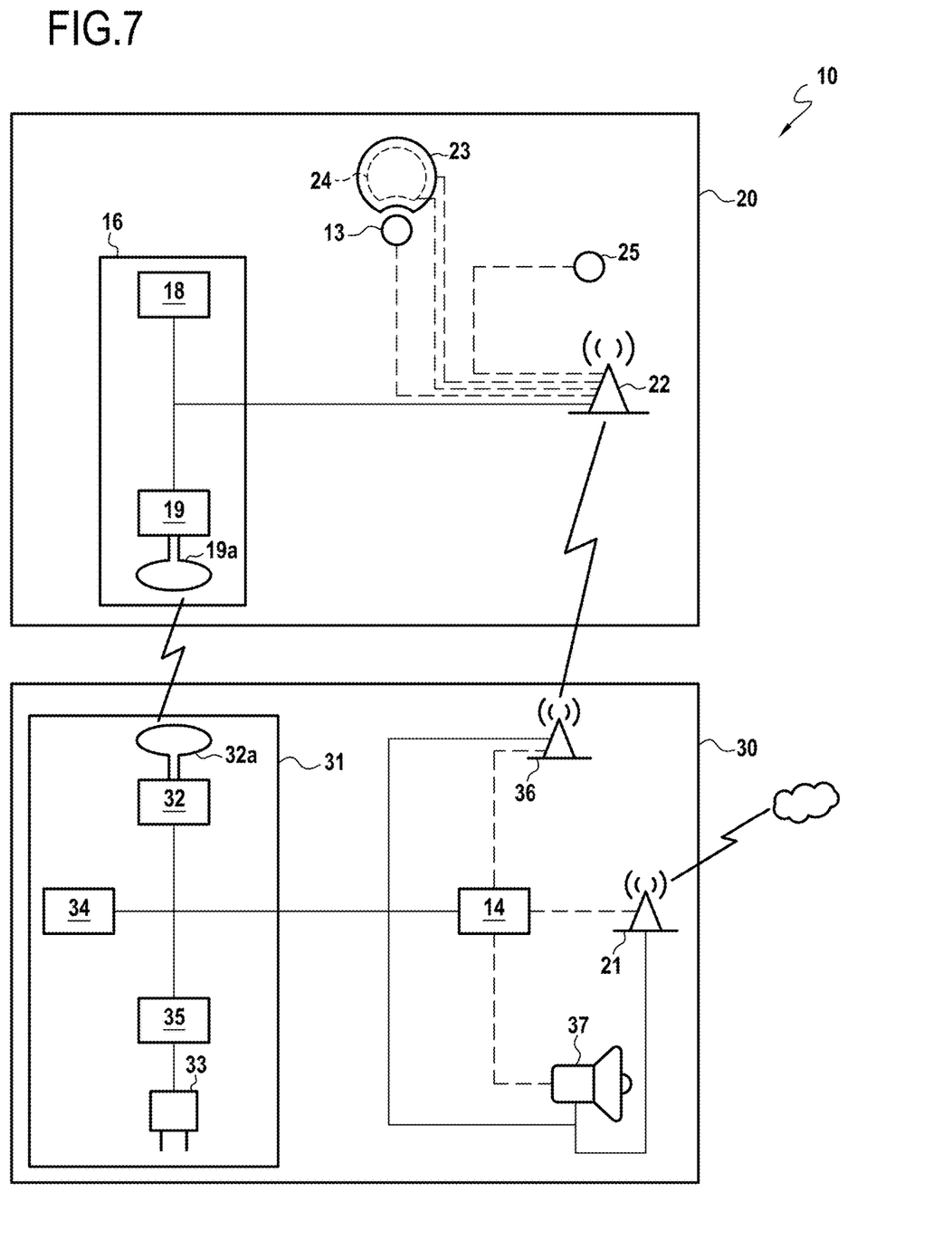

However, alternative arrangements may also be considered. For instance, as illustrated in FIG. 5, the safe container 10 may comprise a third wireless transceiver 22, within the main housing 20, configured for wireless communication with the second wireless transceiver 36. In this case, both the second and the third wireless transceivers 36, 22 may in particular be Bluetooth® or NFC transceivers, and both may have a shorter range than the first wireless transceiver 21. Moreover, with such wireless communication between the main housing 20 and the charging base 30, each one of the electronic control unit 14 and the first wireless transceiver 21 may be located in either one of the main housing 20 and the charging base, as illustrated in FIGS. 6 and 7. Additionally, each one of the razor cartridges 101 and/or the shaver 100 may also incorporate further transceivers configured to communicate with the first, second and/or third transceivers 21, 36, 22. For example, the shaver 100 may be the smart shavers disclosed in international patent application publications WO 2019/011523 A1 and WO 2019/001893 A1 (both incorporated herewith by reference), equipped with sensors for detecting skin and hair characteristics, and connected to the first, second and/or third transceivers 21, 36, 22 to transmit e.g. data concerning shaving quality.

The safe container 10 may also comprise one or more information input and/or output units. For example, it may comprise a visual display 23, located for instance on the main housing 20, which may be operatively connected to the electronic control unit 14 for visually presenting to the user information from the electronic control unit 14. This visual display 23 may be for instance a liquid crystal display (LCD), a light-emitting diode (LED) or organic light-emitting diode (OLED) OLED display, or and encapsulated electrophoretic (smart ink) display. The visual display 23 may further be combined with an overlaid sensor layer 24, e.g. a capacitive or resistive sensor layer, so as to form a touch-sensitive control-display unit or touchscreen, representing both an input and an output unit. It may also comprise, alternatively or additionally to a visual display unit, a sound output unit such as, for instance, a speaker 37 located within the charging station 30, and which may be connected to the second wireless transceiver 36 and configured to output sound broadcast from an external device such as a smartphone.

The safe container 10 may also comprise one or more sensors 25 for detecting a number of replacement razor blade cartridges 101 remaining within the second receptacle 12, which may in particular be configured as a smart dispenser such as that disclosed in international patent application publication number WO 2019/001895 A1 (also incorporated herewith by reference), using for instance electrical contacts to determine the presence or absence of a replacement razor blade cartridge 101 within a corresponding slot of the second receptacle 12. Alternatively, however, if each replacement razor blade cartridge 101 comprises a wireless transceiver, even a passive wireless transceiver such as an RFID tag, the detection of the number of replacement razor blade cartridges 101 remaining within the second receptacle 12 may be carried out by communication of any one of the first, second and/or third transceivers 21, 36, 22 with the wireless transceivers of the replacement razor blade cartridges 101 within the second receptacle 12.

Figure 8:
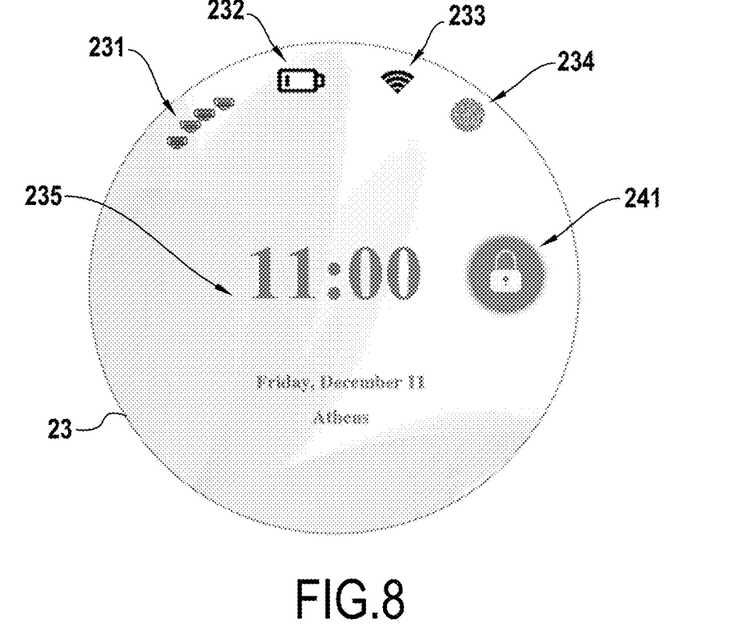
FIGS. 8 to 12 illustrate a visual display of the safe container of FIG. 1 in various states.

In use, the visual display 23 may show, as illustrated in FIG. 8, an indicator 231 of the number of replacement razor blade cartridges 101 remaining in the second receptacle 12, a state of charge indicator 232, which may indicate the state of charge of the first power storage device 18, a wireless reception strength indicator 233, which may indicate a reception strength of a signal from e.g. a wireless router, by the first wireless transceiver 21, and a biometric ID indicator 234, which may indicate whether a user's biometric features have already been stored in the data storage 14b of the electronic control unit 14. The biometric ID indicator 234 may for instance be colored green if such biometric features have already been stored, or flash red if they have not been stored yet. Additional display elements may include time, day, date and location displays 235, as well as an interactive unlock icon 241 if the visual display 23 has an overlaid sensor layer 24 as an input unit.

Figure 9:
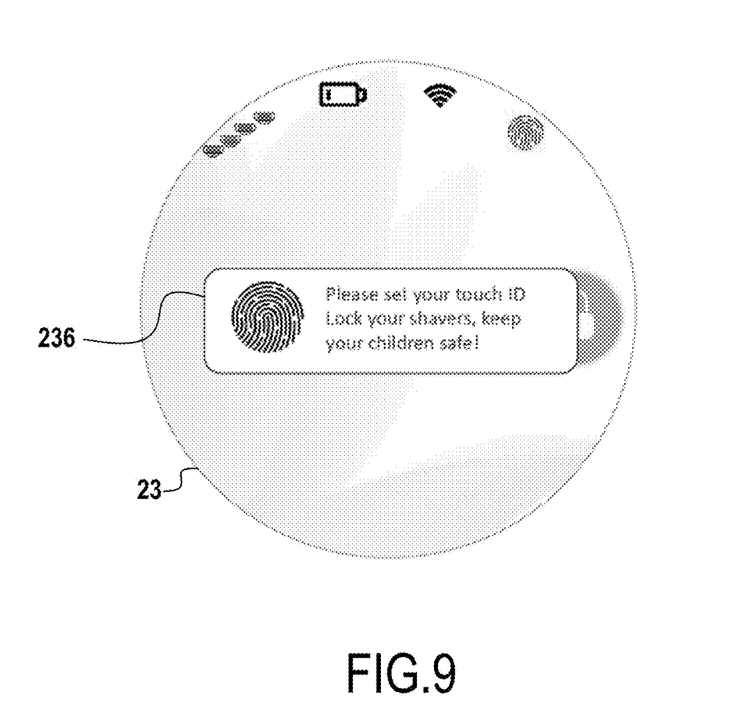

When biometric features have not yet been stored, the visual display 23 may display a message 236 reminding the designated user to set up the biometric lock, as shown in FIG. 9. The biometric lock may then be set up using its sensor 13 to read the designated user's biometric features for a first time, and storing them in the data storage 14b of the electronic control unit 14 so as to determine the designated user of the safe container 10 and of the shaver 100 and replacement razor blade cartridges 101 contained therein. Alternatively, however, the designated user's biometric features could be downloaded, for instance over the first, second and/or third transceiver 21, 36, 22, from a remote server, where they could have been previously stored.

Figure 10:
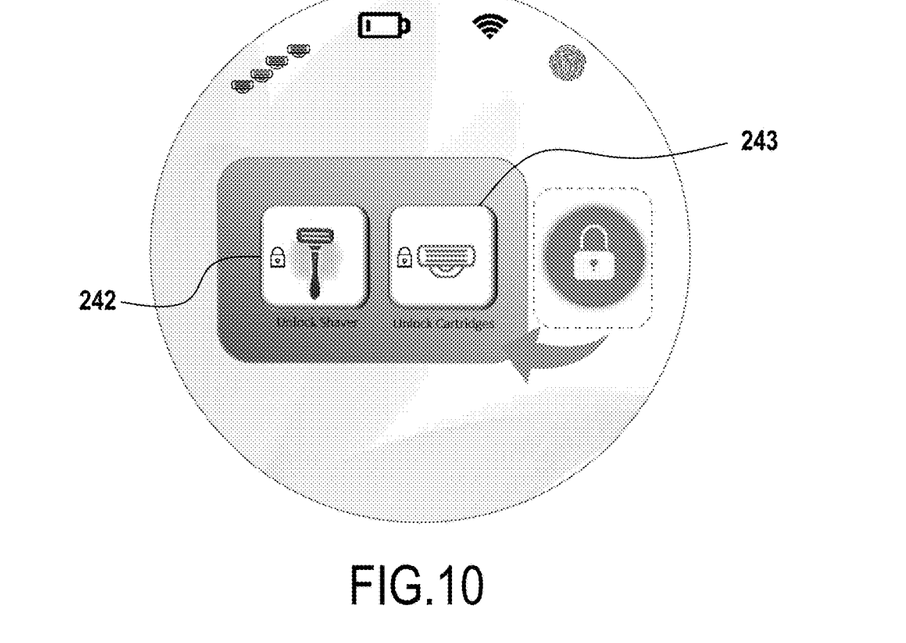
Figure 13:
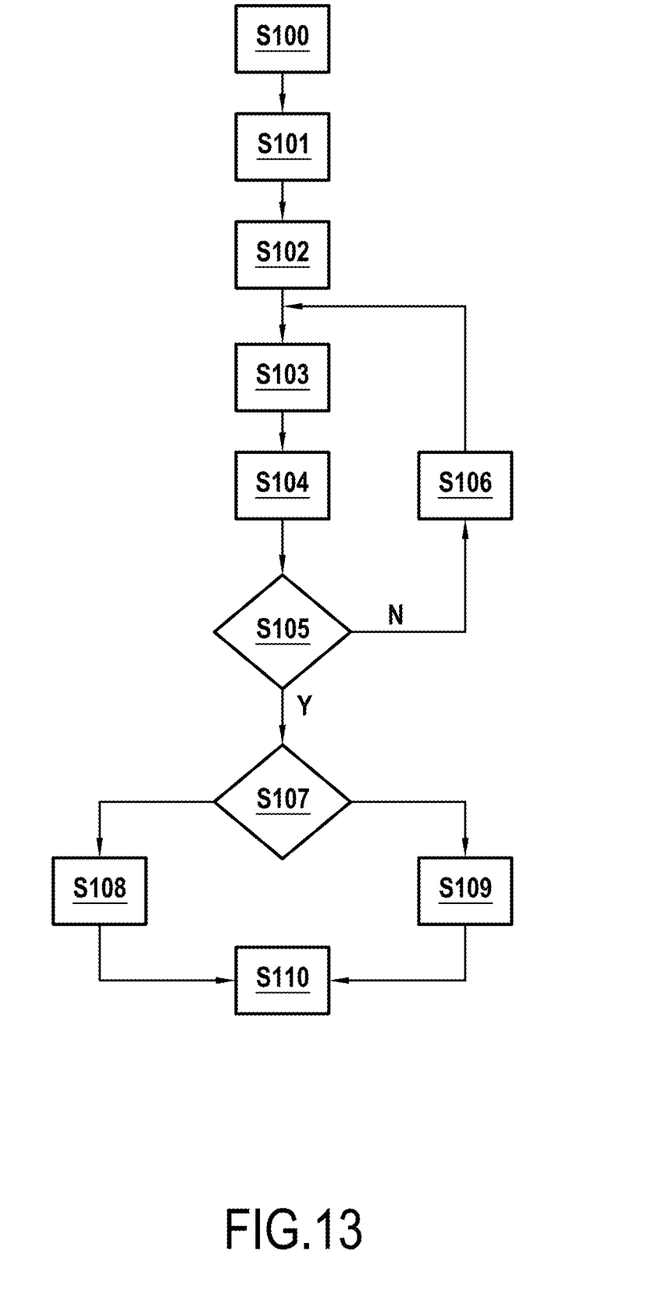
FIG. 13 is a flow chart of a process of using the safe container of FIG. 1.

Once the designated user's biometric data have been stored, the process to unlock the safe container 10 may proceed as illustrated in FIG. 13. In a first step S100 in this process, the designated user may initiate the process by, for instance, touching the interactive unlock icon 241 on the visual display 23, although other input paths, such as for instance a voice command, may alternatively be used. In the next step S101, in response to this input, a choice to unlock the first receptacle 11 or the second receptacle 12 may be presented to the designated user by displaying two new interactive icons on the visual display 23: a shaver unlock interactive icon 242 and a cartridge unlock interactive icon 243, for instance as shown in FIG. 10. Alternatively or additionally to these icons, however, the choice may be presented to the designated user through a voice interface. The designated user may then input his choice in the next step S102, for instance by touching the corresponding interactive icon and/or by a voice command. After this choice is input, in the next step S103 the designated user may be prompted, for instance by a message on the visual display 23 and/or by a voice message, to confirm his identity using the sensor 13 of the biometric lock.

In the next step S104, the sensor 13 of the biometric lock may then read the designated user's biometric features, which may then be transmitted to the electronic control unit 14, where in a further step S105 they may be compared by the data processor 14a to the biometric features stored in the data storage 14b. In case of a negative match, an error message may be output, through the visual display 23 and/or the speaker 37, in step S106, and the process may loop back to step S103. On the other hand, in case of a positive match, the process may proceed to another step S107, where the electronic control unit 14 may determine whether in previous step S102 the designated user chose to unlock the first receptacle 11 or the second receptacle 12.

While in the illustrated example the designated user was presented with the choice of unlocking the first receptacle 11 or the second receptacle 12 in step S101 and entered this choice in step S102 before the biometric authentication steps S103, S104 and S105, the steps S101 and S102 of presenting the alternatives and receiving the user's choice could alternatively take place after the biometric authentication in steps S103, S104 and S105. In both cases, if in step S107 it is determined that the designated user chose to unlock the first receptacle 11, the process may proceed to step S108, where the electronic control unit 14 may activate the actuator 15 to open the first receptacle 11. On the other hand, if in step S107 it is determined that the designated user chose to unlock the second receptacle 12, the process may proceed to alternative step S109, where the electronic control unit 14 may activate the actuator 15 to open the second receptacle 12.

Figure 11:
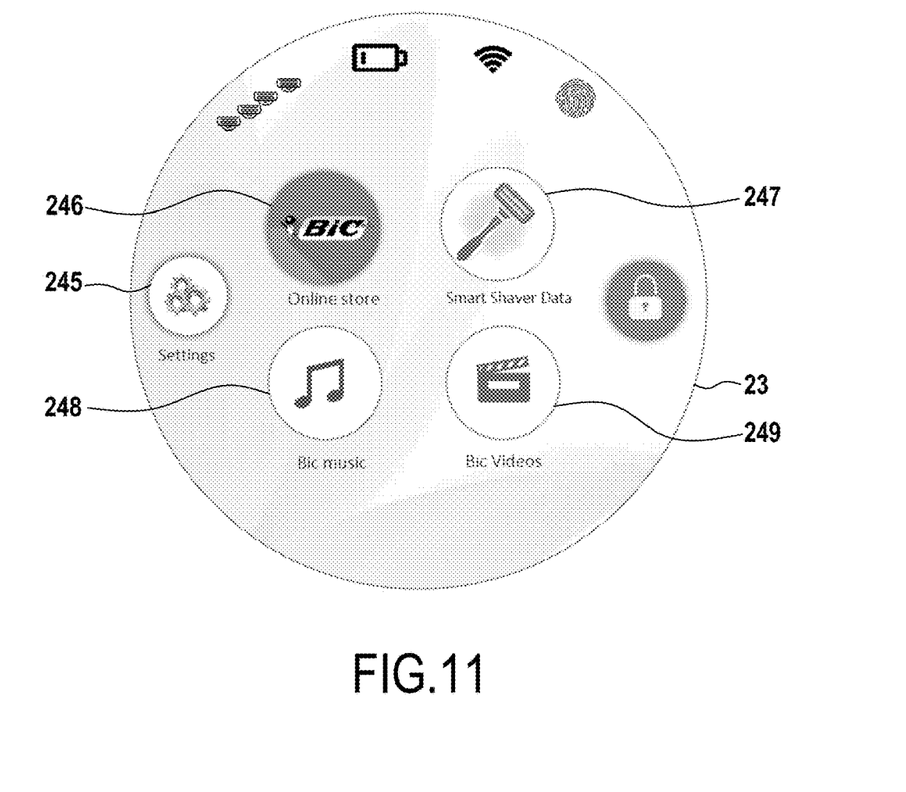

Finally, after either step S108 or step S109, the process may proceed to step S110, wherein new interactive icons may be displayed on the visual display 23. As illustrated in FIG. 11, these additional interactive icons may include, for example, a settings icon 245, for access to settings of the safe container 10, an online store icon 246, for access to an online store app for buying i.a. new replacement razor blade cartridges, a smart shaver data icon 247 for access to data collected through shaver 100, and music and video icons 248, 249 for playing corresponding audiovisual content through the visual display 23 and/or the speaker 37.

Figure 12:
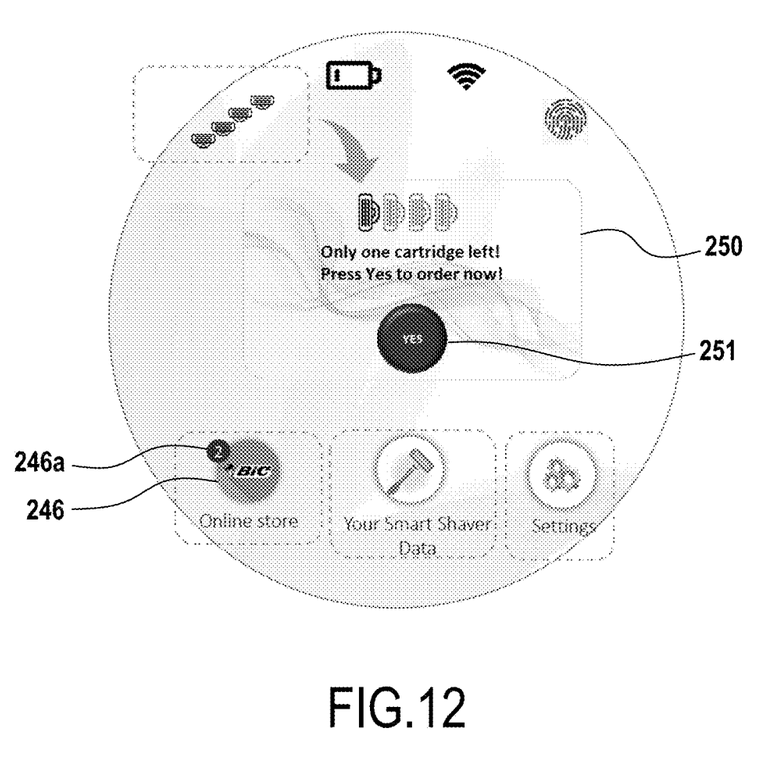

The electronic control unit 14 may determine, through the one or more sensors 25 and/or the first, second and/or third transceivers 21, 36, 22, that the number of replacement razor blade cartridges 101 remaining in the second receptacle 12 is below a predetermined threshold of, for example, two replacement razor blade cartridges 101. In this case, a warning may be issued that the number of replacement razor blade cartridges 101 remaining in the second receptacle 12 is below a predetermined threshold, for example through a warning message 250 displayed on the visual display 23 and/or voiced through the speaker 37. As shown in FIG. 12, when this warning is issued, it may include an option for ordering new replacement razor blade cartridges 101, for example through an interactive button 251 on the visual display 23.

In visual display 23, the indicator 231 of the number of replacement razor blade cartridges 101 remaining in the second receptacle 12 may also be interactive, so that, if touched, it may link directly to a replacement razor blade cartridge ordering menu of the online store application. As also shown in FIG. 12, the online store icon 246 may include a notification 246a of incoming messages, concerning e.g. special offers. Any order, for example through the online store application and/or through interactive button 251, may be authenticated through the biometric lock, reading the designated user's biometric features through sensor 13 and matching them to the stored biometric features at the electronic control unit 14, analogously to steps S104, S105 of the unlocking process. Once the order has been authenticated, it may then be transmitted to a remote server, for instance over the first transceiver 21, although the second and third transceivers 36, 22 could alternatively form at least part of a transmission chain.

All technical and scientific terms used herein have the same meaning as commonly understood to one of ordinary skill in the art to which this disclosure belongs unless clearly indicated otherwise. As used herein the singular forms "a", "an", and "the" include plural references unless the context clearly dictates otherwise. Thus, for example, reference to "a sensor" may include a plurality of such sensors and reference to "the sensor" may include reference to one or more sensors and equivalents thereof known to those skilled in the art, and so forth.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

The invention claimed is:

1. A safe container, comprising:
    a first receptacle configured to receive a first grooming product;
    a second receptacle configured to receive one or more of a second grooming product, wherein the second grooming product is a shaving product configured to interact with the first grooming product;
    a biometric lock configured to selectively open the first receptacle or the second receptacle to a designated user with authentic biometrics;
    a sensor for detecting whether a quantity within the first receptacle or the second receptacle is below a designated threshold; and
    a display for displaying a warning including a number of the second grooming product in the second receptacle when a quantity is below a predetermined threshold, wherein the warning further includes an interactive button for ordering new replacement razor blade cartridges.

2. The safe container according to claim 1, comprising a transceiver for receiving and transmitting data.

3. The safe container according to claim 2, wherein the transceiver is a wireless transceiver.

4. The safe container according to claim 1, comprising a power supply unit.

5. The safe container according to claim 4, wherein the power supply unit comprises a rechargeable power device.

6. The safe container according to claim 5, wherein the power supply unit comprises a contactless power receiver.

7. The safe container according to claim 5, comprising a charging station for charging the rechargeable power device of the power supply unit, and a main body, separable from the charging station, containing the first receptacle, the biometric lock and the power supply unit.

8. The safe container according to claim 1, comprising one or more information output units.

9. The safe container according to claim 8, wherein the information output units include the display.

10. The safe container according to claim 8, wherein the information output units include a speaker.

11. The safe container according to claim 1, wherein the biometric lock comprises a fingerprint reader.

12. The safe container according to claim 1, wherein the biometric lock comprises an actuator.

13. The safe container according to claim 1, wherein the one or more shaving product includes one or more razor blade cartridges within the second receptacle.

14. A method of using the safe container of claim 1, comprising:
   determining that the quantity within the first receptacle and/or within the second receptacle is below the predetermined threshold, and
   issuing the warning that the quantity is below the predetermined threshold.

15. The safe container according to claim 6, comprising a charging station for charging the rechargeable power device of the power supply unit, and a main body, separable from the charging station, containing the first receptacle, the biometric lock and the power supply unit.

16. The safe container according to claim 9, wherein the information output units include a speaker.

17. A method of using the safe container of claim 13, comprising:
   determining that the quantity within the first receptacle and/or within the second receptacle is below the predetermined threshold, and
   issuing the warning that the quantity is below the predetermined threshold.

18. The safe container according to claim 1, wherein the biometric lock comprises another sensor configured to read the designated user's biometric features.

19. A safe container comprising:
   a first receptacle configured to receive a grooming product;
   a second receptacle configured to receive one or more razor blade cartridges;
   a biometric lock configured to selectively open the first receptacle or the second receptacle to a designated user with authentic biometrics;
   a sensor for detecting whether a quantity within the first receptacle or the second receptacle is below a designated threshold; and
   a display for displaying a warning including a number of razor blade cartridges in the second receptacle when a quantity is below a predetermined threshold, wherein the warning further includes an interactive button for ordering new replacement razor blade cartridges.

* * * * *